Jan. 21, 1947.　　　F. F. GUNTHER　　　2,414,521
BEVERAGE DISPENSER
Filed June 30, 1944
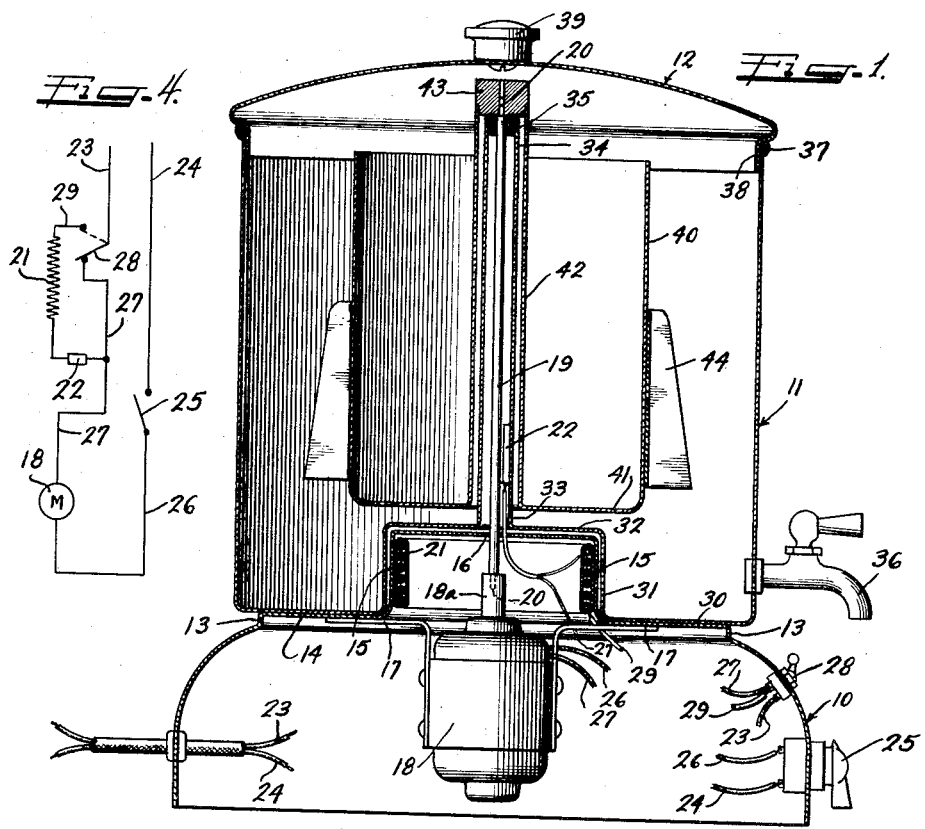
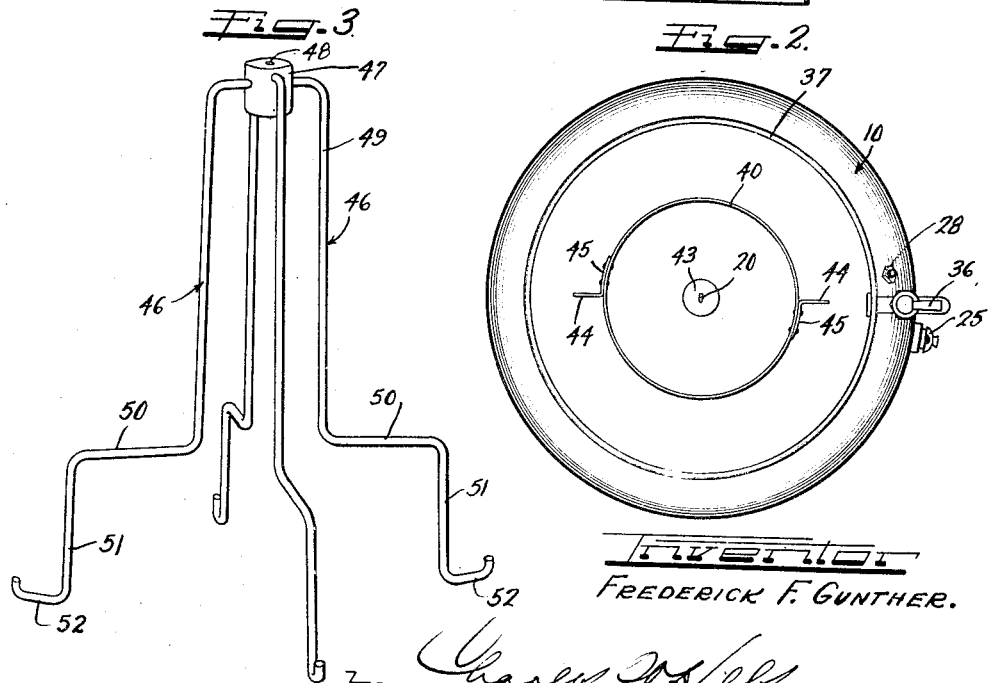
Inventor
FREDERICK F. GUNTHER.

Patented Jan. 21, 1947

2,414,521

UNITED STATES PATENT OFFICE 2,414,521

BEVERAGE DISPENSER

Frederick F. Gunther, Chicago, Ill., assignor to Helmco, Inc., Chicago, Ill., a corporation of Illinois Application June 30, 1944, Serial No. 542,957

2 Claims. (Cl. 259—108)

This invention is directed to an improved beverage dispenser and relates more particularly to a dispenser in which temperature control of the beverage is desirable.

With respect to chocolate milk or other beverages of that type, certain difficulties have been experienced in the past in maintaining such beverages at a reduced temperature for ready and immediate distribution to the customer since, by their very nature, these beverages are detrimentally affected by the presence of ice therein, as the ice melts and dilutes the beverage to the point where it is not saleable.

It is an object of the present invention to provide an improved dispenser wherein a non-dilutable beverage such as chocolate milk or the like may be maintained at a low temperature for summer sale without requiring the installation of complex refrigerating units.

Still another object of the present invention is to provide a dispenser wherein beverages such as chocolate milk or the like having a sedimentary content may be constantly agitated so as to be ready for immediate distribution to the customer not only from the standpoint of the temperature thereof but from the standpoint of the richness thereof since the sedimentary content is constantly agitated to prevent settling.

In the past it has been found, in the sale of beverages, that in winter, beverages made from milk or the like and thus not being subject to dilution, can be sold to the public since such beverages may be warmed. However, in order that the beverage dispensed to each customer may be of the desired richness, it has been customary in the past to make up each customer's portion at the time it is ordered, thus necessitating a wait on the customer's part and involving considerable costly and unnecessary labor.

With the present invention it is possible to make up a large quantity of the beverage and to maintain it at a given temperature, be that temperature warm for winter consumption or cold for summer consumption. Furthermore, whatever the temperature requirements might be, the present invention enables the large quantity of beverage to be constantly agitated whereby sedimentation is prevented to any appreciable degree.

Accordingly, it is an important object of the present invention to provide a beverage dispenser which is susceptible of being manufactured cheaply and in which the beverage may be constantly agitated so as to be of uniform richness throughout and in readiness for distribution to the customer at all times.

It is another object of the present invention to provide a dispenser having means whereby the beverage may be maintained at substantially freezing temperature without the use of mechanical refrigeration and without the beverage becoming diluted due to the presence of ice used for reducing the temperature thereof.

It is another object of the present invention to provide a beverage dispenser which is universal in that it may be utilized to dispense either hot or cold beverage and wherein the beverage, regardless of its temperature, may be constantly agitated to prevent sedimentation therein.

More specifically, it is an object of the present invention to provide a beverage dispenser including a container adapted to serve as a reservoir for a multiplicity of servings of a beverage, this container having a base portion into which a motor is adapted to be mounted and also having a central, liquid-proof column extending upwardly therefrom which is arranged to receive the remote end of a drive shaft connected with the motor, this remote end of the drive shaft being arranged to receive a circulator which may take the form of depending legs or may take the form of a container into which ice may be placed, whereby heat exchange between the ice in the container and the beverage will reduce the temperature of the beverage to substantially that of the ice as the container is rotated by the shaft to the upper end of which it is connected, this container for the ice preferably having radially outwardly extending fins thereon for agitating the beverage to prevent sedimentation therein and to insure complete cooling thereof.

Many other objects and advantages of the invention will become apparent from the following description and accompanying drawing, in which:

Figure 1 is a vertical, cross-sectional view, certain parts being shown in elevation, of a dispenser embodying one form of my invention;

Figure 2 is a top plan view of the structure shown in Figure 1;

Figure 3 is a perspective view of an alternate form of circulator which may be used with the construction of Figure 1; and Figure 4 is a wiring diagram showing one manner in which the circuits may be connected to the mechanism of Figure 1.

It will be understood that the embodiments shown herein are for illustrative purposes and may be changed or modified without departing from the spirit and scope of the invention as set forth in the appended claims.

The mechanism shown in Figure 1 includes generally a base 10 upon which is seated a container 11 having a suitable cover 12.

The base 10 is preferably circular in configuration with an inwardly divergent upper part terminating in an upstanding flange 13 which in turn terminates radially inwardly in an annular platform 14. The platform 14 in turn terminates in a radially inwardly disposed, upstanding circular part 15 having a central aperture 16 therein. There is secured in the base 10, in any suitable manner as by brackets 17, a motor 18 having the drive thereof disposed vertically and aligned with the aperture 16 in the upstanding cup part 15 of the base. A drive shaft 19 having identical ends including reduced flat portions 20 is set in the cooperating drive portion 18a of the motor 18 and extends upwardly in the base through the aperture 16.

If beverage in the container 11 is to be heated, there is provided a heating coil 21 which is circular in construction and is fitted and secured within the upstanding cap portion 15 of the base, this heating coil being in circuit with a thermostat 22 to be further described presently.

It will be understood that various circuits may be utilized for energizing the motor 18 and the coil 21, however, in the present instance, as shown in Figure 4, this circuit includes leads 23 and 24, there being a master switch 25 therein for controlling both the heating coil and the motor. A conduit 26 connects the switch with the motor 18 and a conduit 27 connects the other side of the motor with one pole of a double pole, double throw switch 28 while the other pole thereof is connected with the heating element 21 by a lead 29. With the foregoing arrangement and circuit it will be seen that when the switch 28 is in the dotted line position shown in Figure 4, the heating coil 21 and thermostat 22 will be in the circuit and will be operated simultaneously with the motor in accordance with the operation of master switch 25. If, on the other hand, the switch 28 is thrown to the full line position shown in Figure 4, the heating element 21 and the thermostat 22 will be thrown out of the circuit and only the motor 18 will be energized in accordance with the position of master switch 25. It will be seen that this latter setting of the circuit will adapt the device to summer use when the beverage is not to be heated while the dotted line position of the switch 28 will adapt the device for winter use when a hot beverage is desired.

As shown in Figure 1, the lower part of the container 11 includes an outer annular bottom portion 30 which is arranged to rest upon the platform part 14 of the base. This annular portion 30 terminates inwardly in an integral upstanding portion 31 which in turn terminates in an annular, horizontal portion 32, the center of which connects integrally with an upstanding tubular portion 33 that extends upwardly above the level at which beverage would normally stand in the container, as shown at 34. The tubular portion 33 is of course aligned with the aperture 16 and thus may receive the shaft 19 connected with the motor and is provided at the upper end with a bushing closure 35 through which the flattened drive portion 20 at the upper end of the rod may extend for rotation.

From the foregoing, it will be seen that the container 11 is provided, generally, with an annular, outer beverage containing portion and a central, vertical passage through which the drive shaft 19 may extend without coming into contact with beverage that is carried by the container. Furthermore the container is provided with the inverted cup portion defined by walls 31 and 32 into which the inverted cup portion 15 of the base and the heating element may extend, thereby to be disposed in the body of liquid in the container to efficiently heat the same when in the circuit.

The container 11 is further provided with a suitable outlet such as the faucet 36 at the lower portion thereof. If desired, the upper edge of the container may be beaded outwardly as at 37 to receive the depending skirt 38 of the cover 12. The cover, if desired, may be provided with a suitable insulating handle 39.

As indicated previously, in the absence of mechanical refrigeration, considerable difficulty has been experienced in efficiently cooling beverages, the desirable characteristics of which are lost if they are mixed with ice which dilutes them. To the end that this difficulty may be overcome and to the end that an extremely cheap and efficient mechanism may be provided for cooling the beverage within the container 11, there is provided herein a central container having a cylindrical wall 40 and integral, annular bottom portion 41 which merges at the inner edge thereof with an integral, upstanding central tubular part 42 having a diameter somewhat larger than the tubular part 33 of the container 11. The upper end of the tubular part 42 of the inner container is closed by an insert 43 which is fixedly secured thereto, this insert 43 being provided with a centrally disposed slot adapted to non-rotatably receive the flattened end 20 of the drive shaft 19.

The inner container is completed by the provision of a plurality of fins 44 secured in any suitable manner to the outer side thereof as by integral flange portions 45 which may be riveted to the cylindrical wall 40.

As shown in Figure 1, the thermostat 22 may be of the pencil type and is fitted onto the inner surface of the tubular portion 33 of the container 11 with the leads therefor extending downwardly through the aperture 16 in the base.

Since the construction of Figure 1 is intended for summer use and is to be utilized to maintain a beverage in the container 11 at a reduced temperature, the switch 28 is thrown to the position shown in full lines in Figure 4, with the result that the heating coil 21 and the thermostat 22 are completely cut out of the circuit. Ice is then placed in the inner container in an amount to substantially fill the same, whereupon the beverage in the outer container 11 is subjected to the cooling effect through the cylindrical wall 40 and the bottom 41 of the ice container. The switch 25 is then turned on to complete the circuit through the motor, whereupon, through the medium of the drive shaft 19 and the insert 43, the inner container, together with the fins 44 is rotated. It has been found that the action of the fins thoroughly mixes the beverage in the container 11 with the result that sedimentation does not take place and with the result that the beverage is thoroughly mixed so that it is evenly cooled throughout. In the use of a device such as that shown in Figure 1, it has been found that with the cover 12 maintained in position, the ice in the container lasts a normal working day and the beverage within the container 11 is maintained at a temperature generally that of the cold mixture in the ice container.

Another attribute of the construction shown in Figure 1 is the sanitary characteristics thereof. It will be seen that with the tubular housings 33 and 42 no liquid can gain entrance to the interior of the base. Furthermore, the water and ice in the inner container are maintained separately from the beverage so that the latter is not diluted during the cooling operation.

Furthermore, the operator may easily and quickly, however inexperienced, disassemble the device by grasping the tube 42 and raising the inner container from within the container 11. Thereafter the operator may remove the bushing 35 from the tube 33 and disassemble the drive shaft 19 from the motor in order to clean the same. Since the drive shaft 19 has identical ends the operator may replace the same, either end first.

If the container 11 is to be used as a reservoir for a beverage to be heated, as for hot chocolate or the like, the switch 28 is thrown to the position shown in dotted lines in Figure 4 and the inner container is replaced by the circulator construction shown in Figure 3.

This circulator construction includes a plurality of depending leg members 46, all of which have their upper ends secured to a member 47 similar to the insert 43 and also having a slot 48 therein for receiving the flattened portion 20 at the upper end of the drive shaft 19. Each of the legs 46 is provided with a relatively long upper portion 49 which terminates in a horizontally extending portion 50 that extends over the surface 32 of the container 11. The horizontal portions 50 each terminate in downwardly extending portions 51 which in turn terminate in outwardly curled ends 52 that are disposed immediately above the upper surface of the annular part 30 of the container 11.

Thus, when the circulator construction shown in Figure 3 is attached in the container 11 in the place of the inner container shown in Figure 1 and the switch 25 is turned on, the motor rotates the circulator and the heating coil 21 controlled by thermostat 22 heats the beverage in the lower part of the container 11, this heated portion rising to replace the colder portion at the top of the container. It will therefore be seen that the beverage within the container is heated and is also circulated efficiently to prevent sedimentation.

From the foregoing it will be seen that I have provided a universal beverage container in that it may be used either to heat or cool beverages and in cooling the beverages it is not necessary to dilute the same with the cooling medium even though mechanical refrigeration is not availed of.

What I claim is:

1. In a liquid receiving assembly for controlling the temperature of liquid therein; a base member, a motor in said base, a central well having the form of an inverted cup upstanding from the upper part of said base, a heating element housed in said well; a liquid receiving and dispensing container including a liquid confining side wall and a bottom formed to include a radially outer annular portion adapted to be seated on the upper part of said base and a central, inverted well adapted to receive in closely fitting relation the well in said base to afford transmission of heat from said heating element to the liquid in the liquid dispensing container, a circulator rotatable in said dispensing container, a drive connection between said motor and said circulator and an electrical circuit including said motor, said heating element and switch means arranged to selectively energize and deenergize said heating element while said motor remains energized.

2. In a liquid receiving assembly for controlling the temperature of liquid therein including a separable base and a container, said liquid receiving and dispensing container including a liquid confining side wall and a bottom formed to provide an inverted cup extending upwardly into the container, said base having an upstanding inverted cup enterable in said container cup when the container is in place on the base, a heating element in the inverted cup of said base, a circulator in said dispensing container, means for rotatably mounting said circulator, a motor beneath the inverted cup of said base, a drive connection between said motor and said circulator passing through said cups, and an electric circuit including said motor, said heating element and switch means arranged to selectively energize and deenergize said heating element while said motor remains energized.

FREDERICK F. GUNTHER.